US008886157B2

(12) United States Patent
Hawkes et al.

(10) Patent No.: US 8,886,157 B2
(45) Date of Patent: Nov. 11, 2014

(54) MOBILE DEVICE HAVING AN EMERGENCY MODE

(75) Inventors: Philip Michael Hawkes, Warrimoo (AU); Miriam M. Wiggers De Vries, Sydney (AU); Craig M. Brown, Harbord (AU); Alexander Gantman, San Diego, CA (US); Jessica M. Purser, Sydney (AU); Cameron A. McDonald, Sydney (AU); Craig W. Northway, Sydney (AU); Michael W. Paddon, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 12/941,765

(22) Filed: Nov. 8, 2010

(65) Prior Publication Data

US 2012/0115430 A1    May 10, 2012

(51) Int. Cl.
| | |
|---|---|
| *H04M 11/04* | (2006.01) |
| *H04W 76/00* | (2009.01) |
| *H04W 4/22* | (2009.01) |
| *H04W 52/02* | (2009.01) |
| *H04M 1/725* | (2006.01) |

(52) U.S. Cl.
CPC ............ *H04W 4/22* (2013.01); *H04W 52/0254* (2013.01); *Y02B 60/50* (2013.01); *H04W 76/007* (2013.01); *H04M 1/72552* (2013.01); *H04M 1/72536* (2013.01); *H04M 2250/10* (2013.01)
USPC .......................................... 455/404.2; 379/45

(58) Field of Classification Search
USPC ............. 455/404.1–404.2, 456.1–456.2, 466; 709/217; 379/45
See application file for complete search history.

(56) References Cited

U.S. PATENT DOCUMENTS

| 5,937,355 A | * | 8/1999 | Joong et al. ................. 455/466 |
| 2002/0072348 A1 | * | 6/2002 | Wheeler et al. .............. 455/404 |
| 2003/0125010 A1 | * | 7/2003 | Jung ............................ 455/404 |

(Continued)

FOREIGN PATENT DOCUMENTS

| EP | 2229035 A1 | 9/2010 |
| JP | 2006196980 A | 7/2006 |

(Continued)

OTHER PUBLICATIONS

International Search Report and Written Opinion—PCT/US2011/023811, ISA/EPO—Jul. 15, 2011.

(Continued)

*Primary Examiner* — Nathan Taylor
(74) *Attorney, Agent, or Firm* — Won Tae Kim (57) ABSTRACT

Disclosed is an apparatus and method to locate a mobile device in an emergency situation. The mobile device includes a display device, a user interface to receive an emergency mode request from a user, and a processor. The processor may be configured to execute instructions to implement an emergency mode process based upon the receipt of the emergency mode request from the user. The emergency mode process is implemented to: monitor received signals to locate a base station, wherein, once a base station is located, a short emergency message is transmitted to the base station including the location of the mobile device. The emergency mode process is further implemented to: monitor received signals to receive an acknowledgement signal from the base station; and reduce a plurality of first non-essential functions of the mobile device to reduce power consumption.

36 Claims, 4 Drawing Sheets

(56) References Cited

U.S. PATENT DOCUMENTS

| | | | |
|---|---|---|---|
| 2005/0096102 A1* | 5/2005 | Mock et al. | 455/574 |
| 2006/0217105 A1 | 9/2006 | Kumar et al. | |
| 2007/0117574 A1* | 5/2007 | Watanabe | 455/456.1 |
| 2007/0191025 A1* | 8/2007 | McBrierty et al. | 455/456.2 |
| 2008/0005301 A1* | 1/2008 | Li et al. | 709/223 |
| 2008/0188198 A1 | 8/2008 | Patel et al. | |
| 2009/0066564 A1 | 3/2009 | Burroughs et al. | |
| 2010/0306342 A1* | 12/2010 | Zhang | 709/217 |
| 2011/0064205 A1* | 3/2011 | Boni et al. | 379/45 |

FOREIGN PATENT DOCUMENTS

| | | |
|---|---|---|
| JP | 2006262255 A | 9/2006 |
| JP | 2007511137 A | 4/2007 |
| JP | 2007519317 A | 7/2007 |
| WO | WO-2005046188 A1 | 5/2005 |
| WO | WO-2005057834 A2 | 6/2005 |
| WO | WO2009100685 A1 | 8/2009 |

OTHER PUBLICATIONS

Taiwan Search Report—TW100104313—TIPO Sep. 29, 2013.

* cited by examiner

MOBILE DEVICE HAVING AN EMERGENCY MODE

BACKGROUND

1. Field

The present invention relates generally to a mobile device that has an emergency mode that allows a user to request emergency assistance and that conserves power while waiting for emergency assistance.

2. Relevant Background

Today, the use of mobile electronic devices is widespread. Such mobile devices can provide a user with wireless phone access, Internet access, allow the user to perform on-line transactions such as on-line shopping, on-line banking, as well as other applications such as finding maps to particular locations, etc. Thus, today's mobile devices allow for wireless communication as well as almost all of the Internet features associated with non-mobile computer systems. Examples of such mobile electronic devices include: mobile devices, smart phones, cellular phones, personal digital assistants (PDAs), digital cameras, mobile computers, etc. (hereinafter referred to as mobile devices).

Also, methods for tracking the location of mobile devices has improved greatly with the implementation of advanced location technology such as Global Positioning Systems (GPSs) and improved wireless communication between mobile devices and base stations.

However, locating lost or injured people having a mobile device that are in an area of poor mobile phone coverage or that are in areas away from streets and cities (e.g., a remote location) is problematic. This is because if an emergency service, such as, 911 is called, if the person is away from typical streets or outside of a city area, such as, in a park or a very remote location, it is very difficult for emergency services, (e.g., fire engines, police, ambulances, etc.) to locate them. Further, in poor coverage areas, communication is often periodic and/or lost.

Although some people when going to remote locations utilize EPIRB (emergency position-indicating radio beacon), ELT (emergency locator transmitter), or PLB (personal locator beacon) devices, most people do not utilize these types of devices when traveling. Further, EPIRBs, ELTs and PLBs are typically expensive, need to be registered, are country-specific, and have their own particular sets of problems associated with locating lost or injured people.

On the other hand, with the increasing use of mobile devices, many people now have a mobile device, such as a cell phone, that may be utilized to locate an injured or lost person in an emergency situation. Unfortunately, a mobile device may be in a poor coverage area and/or have limited or temporary access to wireless communication. Because of this, there are currently many problems with the use of mobile devices in requesting emergency assistance and providing the proper location data for the emergency service provider to locate the user of the mobile device.

SUMMARY

Embodiments of the invention may relate to an apparatus and method to locate a mobile device in an emergency situation. In one embodiment, the mobile device includes a display device, a user interface to receive an emergency mode request from a user, and a processor. The processor may be configured to execute instructions to implement an emergency mode process based upon the receipt of the emergency mode request from the user. The emergency mode process is implemented to: monitor received signals to locate a base station, wherein, once a base station is located, a short emergency message is transmitted to the base station including the location of the mobile device. The emergency mode process is further implemented to: monitor received signals to receive an acknowledgement signal from the base station; and reduce a plurality of first non-essential functions of the mobile device to reduce power consumption.

DETAILED DESCRIPTION

The word "exemplary" is used herein to mean "serving as an example, instance, or illustration." Any embodiment described herein as "exemplary" or "example" is not necessarily to be construed as preferred or advantageous over other embodiments.

Figure 1:
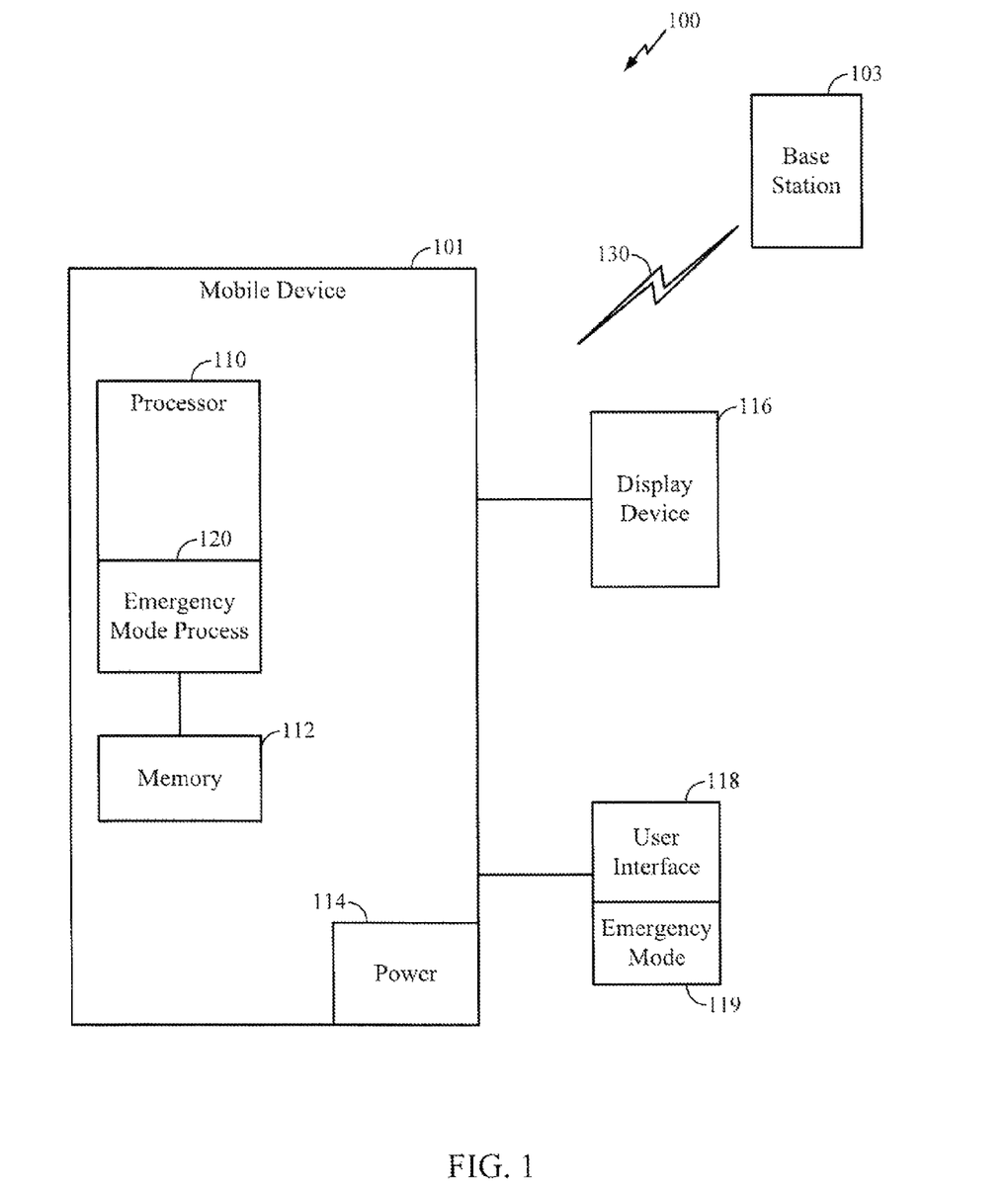
FIG. 1 is a block diagram of a system in which embodiments of the invention may be practiced.

With reference to FIG. 1, FIG. 1 is a block diagram of a system 100 in which embodiments of the invention may be practiced. In particular, system 100 illustrates a mobile device 101 that has an emergency mode to request emergency assistance and to conserve power while waiting for emergency assistance. Mobile device 101 includes a processor 110, a memory 112, a power device 114, a display device 116, and a user interface 118. Mobile device 101 may be a smart phone, cellular phone, personal digital assistant (PDA), digital camera, mobile computer, etc.

It should be appreciated that the display device 116 may be a typical display device for a mobile device 101 such as a smart phone, cellular phone, personal digital assistant (PDA), digital camera, mobile computer, etc. User interface 118 may be a keyboard or keypad separate from the display device 116 (or part of the display device) or any other type of user interface input device for use with a mobile device. Further, power device 114 may be a battery or another type of power source.

In particular, mobile device 101 may include a processor 110 configured to execute instructions for implementing an emergency mode process 120 based upon the receipt of an emergency mode request from a user. For example, a user may implement an emergency mode 119 through the user interface 118. As an example, there may be a special emergency mode button on the user interface keyboard. As another example, the emergency mode 119 may be a vocal command. Another way to select the emergency mode 119 may be implemented by a user dialing a number, such as 911, through the user interface. It should be appreciated that a wide variety of different ways to request the emergency mode 119 may be implemented by the mobile device 101. Memory 112 may be coupled to the processor 110 to store the instructions for the emergency mode process 120 for implementation by the processor 110.

Mobile device 101 having processor 110 may be configured to execute instructions for an emergency mode process to: monitor for received signals 130 to locate a base station 103, wherein, once a base station 103 is located, a short emergency message may be transmitted to the base station 103 that includes the location of the mobile device. For example, mobile device 101 may implement a global positioning system (GPS) location system or another well known type of location system to calculate a location for the mobile device. Further, the mobile device 101 may further monitor for received signals 130 to receive an acknowledgment signal from the base station 103. Mobile device 101 may then reduce a plurality of first non-essential functions of the mobile device to reduce power consumption from the power source 114. For example, power source 114 may be a battery.

It should be appreciated that embodiments of the invention as will be hereinafter described may be implemented in conjunction with the execution of instructions by processor 110 of mobile device 101 and/or other circuitry of the mobile device 101 and/or other devices. Particularly, circuitry of the mobile device 101, including but not limited to processor 110, may operate under the control of a program, routine, or the execution of instructions to execute methods or processes in accordance with embodiments of the invention. For example, such a program may be implemented in firmware or software (e.g. stored in memory 112 and/or other locations) and may be implemented by processors, such as processor 110, and/or other circuitry of mobile device 101. Further, it should be appreciated that the terms processor, microprocessor, circuitry, controller, etc., refer to any type of logic or circuitry capable of executing logic, commands, instructions, software, firmware, functionality, etc.

Further, mobile device 101 may communicate via one or more wireless communication links 130 that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device 101 may therefore wirelessly communicate with other mobile devices, cell phones, other wired and wireless computers, Internet web-sites, etc.

Various embodiments will now be described. For example, in one embodiment, the short emergency message may be a short emergency message that is transmitted immediately to the first located base station 103 and the base station 103 then transmits the short emergency message to local emergency service providers such as a Fire Department, Police Department, Hospital, Ambulance Service, etc. In one, embodiment, the short emergency message may be a short message service (SMS) text message.

As one particular example, the short emergency message may be transmitted if 911 is inputted to the user interface 118. The short emergency message may be transmitted to the nearest base station 103 and then to the nearest 911-based emergency system. It should be appreciated that a wide variety of different types of emergency service providers, such as a 911 type of emergency service provider, may be utilized. It should be noted that dependent upon the geological location, a wide variety of different types of emergency service providers may be used dependent upon the country, state, locality, etc.

Figure 2:
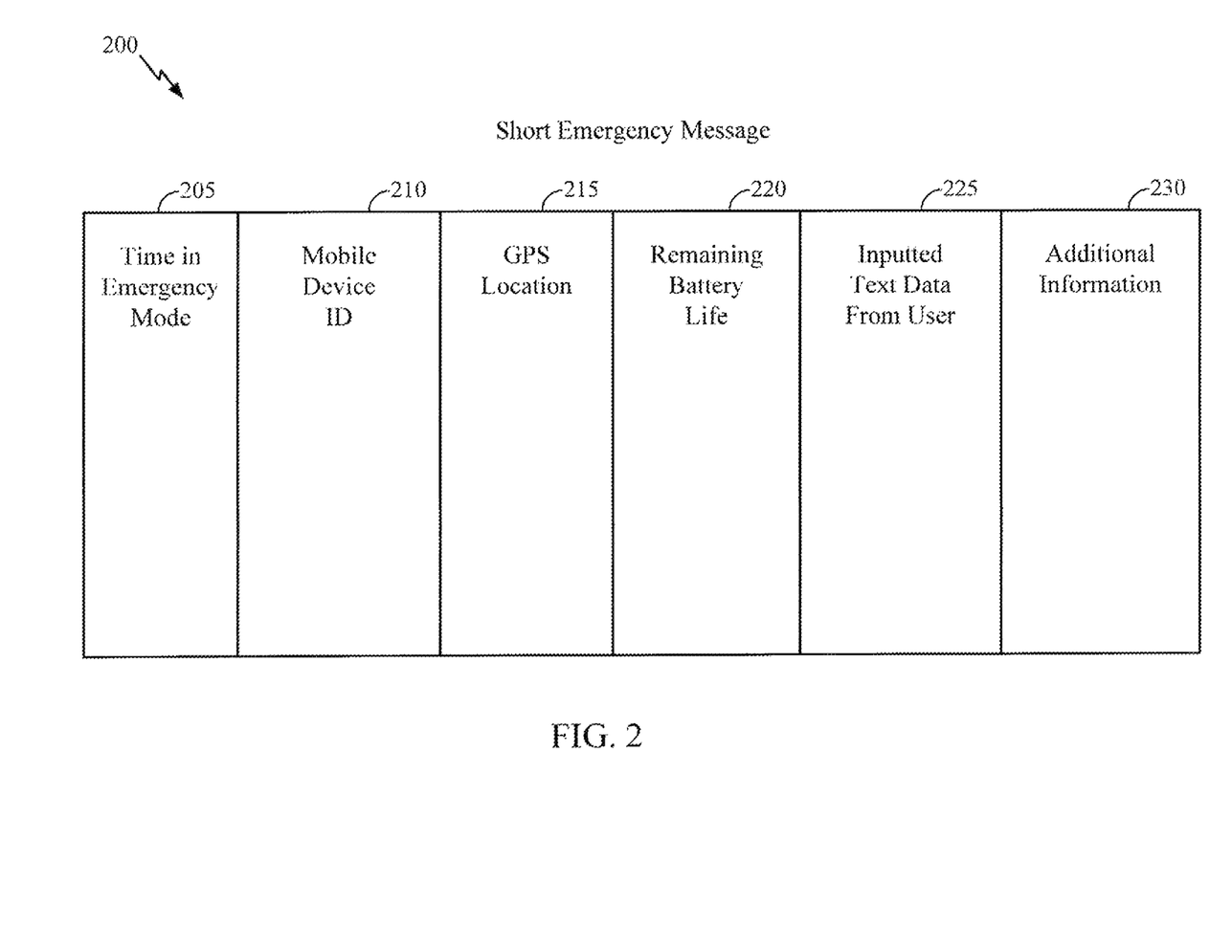
FIG. 2. is a diagram of different types of data that may be transmitted in a short emergency message.

The short emergency message may include a wide variety of different types of information. With reference to FIG. 2, FIG. 2. is a diagram of different types of data that may be transmitted in a short emergency message 200. The short emergency message 200 that is transmitted by the mobile device 101 to the base station 103 may include such data as: the time in the emergency mode 205, the mobile device ID 210, the GPS location of the mobile device 215, the remaining battery life of the mobile device 220, particular inputted text data from the user of the mobile device 225, as wells as other types of additional information 230.

In one embodiment, the short emergency message 200 may part of a registration protocol for a mobile device standard or a cell phone standard. In this embodiment, the short emergency message 200 would not be a part of normal operations, such as, a short message service text message.

The use of a short emergency message 200 is advantageous in that it maximizes the reception likelihood by the base station 103, utilizes low power from the mobile device 101, and is useful in poor coverage areas. As will be described, by transmitting this information to a base station 103, as soon as a base station 103 is recognized, this information may then be transmitted to an emergency service provider (e.g., a fire station, police station, hospital, ambulance, etc.) such that the user of the mobile device 101 may then be located to help with their emergency. By using a short emergency message 200 there is a greater chance of receipt of the emergency related data by a base station 103 in a poor coverage area. In one embodiment, the short emergency message 200 may be a SMS text message.

In particular, by the short emergency message 200 including the current GPS location 215, remaining battery life 220, as well as inputted text data from the user 225, this data may be very useful in providing the emergency service provider useful information in determining the location of the user and the current emergency facing the user.

For example, if a user is located in a park with a broken arm, the user may input text 225 indicating the trail or river nearest the user and the emergency situation facing the user, such as, a broken arm, to help the fire department locate and then treat the user once the user is found.

In one embodiment, a short message service (SMS) text message is a good implementation of the short emergency message 200 for transmitting the short emergency message data to a base station 103, as it maximizes reception likelihood, utilizes low power from the mobile device 101, and has an increased probability of transmission in poor coverage areas.

In one embodiment, the mobile device 101 may reduce various non-essential functions to reduce power consumption from its power source 114, such as a battery. As an example, after receiving an acknowledgment signal 130 from the base station 103 indicating that the base station has received the short emergency message, the mobile device may reduce non-essential functions to reduce power.

In one embodiment, the plurality of first non-essential functions of the mobile device 101 that may be reduced to reduce power consumption from the power source 114 may include reducing or eliminating the display on the display device 116 and/or sound functions.

Additionally, various secondary non-essential functions of the mobile device 101 may also be reduced to reduce power consumption from the power source 114 such as turning GPS location functions off and/or entering an emergency sleep mode.

Moreover, it should be appreciated that "essential functions" of the mobile device 101 may also be reduced or subtly changed to reduce power consumption from the power source 114. It should be appreciated that essential functions may not be wholly turned off but may be subtly changed to reduce power. Examples of these types of essential functions may include such functions as: the frequency at which the mobile device 101 scans for networks; decisions as to whether or not to attempt to establish a connection with a base station, etc.

As an example of an emergency sleep mode, when the emergency sleep mode is entered, the mobile device 101 may be in a sleep mode and may only perform minimal functions, such as, periodically sending an update message to the base station 103 or periodically sending a new location to the base station if the location of the mobile device 101 has changed. Further, new messages may be transmitted only periodically over different time periods (e.g., every hour), or new messages may only be sent if a stronger signal occurs, or a new message may only be sent if the accelerometer data occurs to let searchers know that the mobile device 101 has moved to a new location.

It should be appreciated that a wide variety of different protocols and process steps may be implemented in various orders to reduce non-essential and/or essential functions and to preserve power for the mobile device 101. For example, in one embodiment, once a user enters an emergency mode request, non-essential and/or essential functions of the mobile device 101 may be reduced right away to reduce power consumption from the power source 114 before the short emergency message 200 is sent and before acknowledgement is received back. Alternatively, non-essential and/or essential functions may be reduced after the short emergency message 200 is transmitted. Further, non-essential and/or essential functions may be reduced both before and after the short emergency message 200 is transmitted. The various types of non-essential and/or essential functions have been previously described in detail. It should be appreciated that the reduction of non-essential and/or essential functions to preserve power may be implemented in such a fashion as to ensure the greatest probability of successfully transmitting the short emergency message 200.

As previously described, a mobile device 101, such as a cell phone, may be put into an emergency mode in which it turns off non-essential functions (e.g. display of on-screen data, sound, GPS location functions, etc.) in order to conserve power from the power source 114. Further, in the emergency mode, the mobile device 101 may continuously monitor for transmissions from the base station 103 or other transmissions from an emergency service provider while not continuously trying to connect.

Thus, in accordance with one embodiment, a short emergency message may be sent when an emergency mode is requested by a user such as by selecting an emergency mode button or by dialing 911. By sending the short emergency message 200, as previously described, the reception likelihood by the base station 103 is increased despite poor coverage areas and/or low battery. Further, the base station 103 may estimate the mobile device's location and transmit the estimated mobile device's location, an emergency request, and the short emergency message 200 data to an emergency service provider.

As previously described, using the short emergency message 200, a wide variety of data may be provided such as time in the emergency mode, mobile device ID, GPS location, remaining battery life, inputted text data from the user, additional information, etc. Also, in one embodiment, depending upon the configuration of the mobile device 101, the mobile device may adjust power to increase the power level in order to reach a base station 103 with the short emergency message 200.

Further, it should be appreciated that a wide variety of different types of non-essential and/or essential functions may be reduced for reducing power consumption from the power source 114 during the emergency sleep mode. For example, on-screen data may first be displayed on the display device 116 to the user to show that a base station 103 has received the short emergency message 200 and has transmitted it on to an emergency service provider—and then the display device 116 and sound may be disabled. Additionally, the GPS function of the mobile device may be turned off.

According to different embodiments, when the mobile device 101 is in the emergency mode, new messages may be transmitted by the mobile device every hour to the base station 103, only if a stronger signal is received from a base station 103, and/or only if the position of the mobile device 101 has changed (e.g., measured from accelerometer or compass). In particular, the accelerometer may be monitored to determine whether to turn on the GPS of the mobile device 101 in order to generate a new location and to then transmit the new location to the base station 103 and/or the emergency service providers.

Also, if an emergency phone number is dialed (e.g., 911) or the emergency button selected while the mobile device 101 is out of range of a base station 103, then the mobile device 101 may automatically go into the emergency mode and let the user know via the display device 116 that an emergency mode has been entered and prompt the user to enter in data for the short emergency message 200 such as text data regarding their location. For example, if a user is in a National Park away from streets, a user may indicate what trail they are on and/or their location nearest a well-known location, e.g., a river, monument, sign, mountain, hill, etc.

Figure 3:
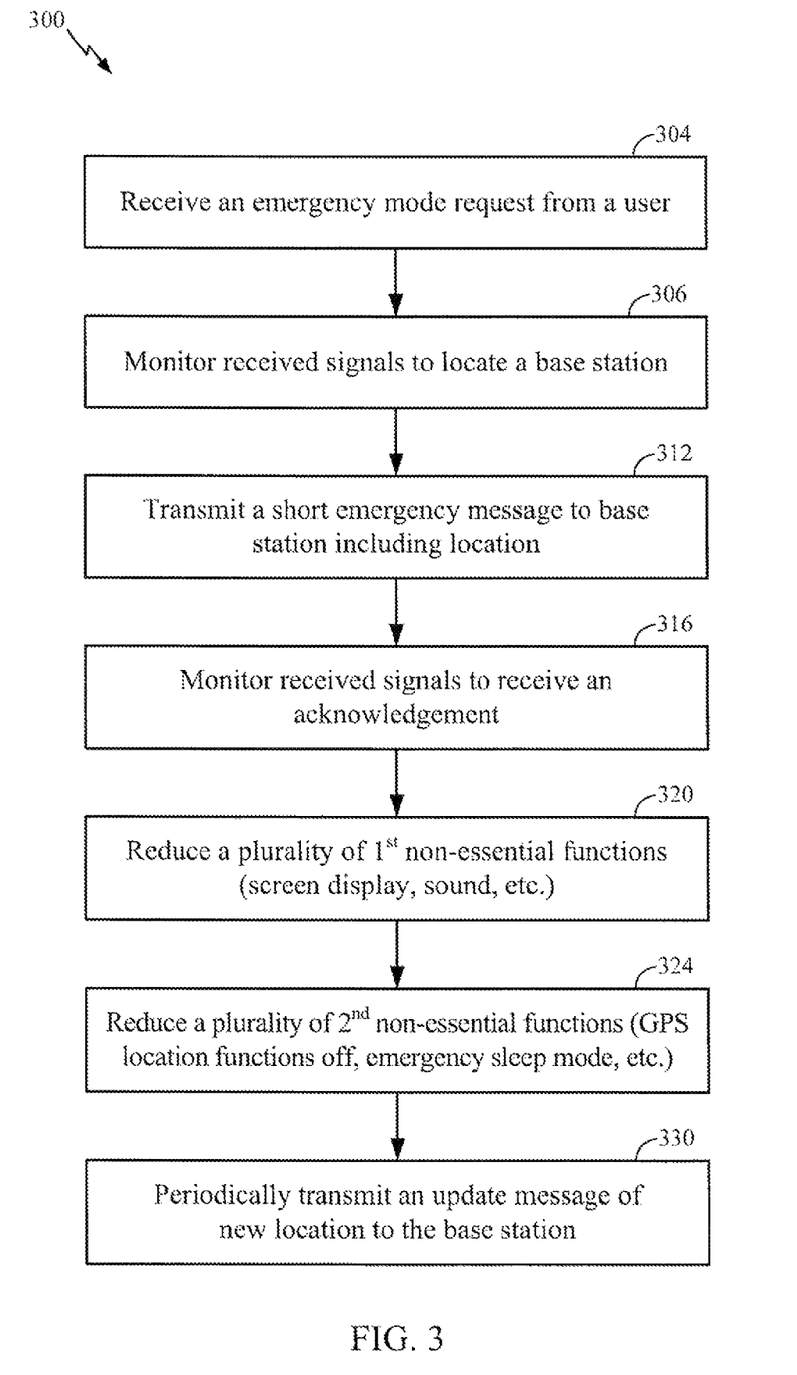
FIG. 3 is a flow diagram that illustrates a process to implement an emergency mode.

With reference to FIG. 3, a flow diagram is shown to illustrate a process 300 to implement an emergency mode, according to one embodiment of the invention. At block 304, an emergency mode request is received by the mobile device from the user. The mobile device then monitors received signals to locate a base station (block 308). Once a base station is located, a short emergency message is transmitted to the base station including at least the location of the mobile device (block 312). The mobile device then monitors received signals to receive an acknowledgment from the base station (block 316).

Once an acknowledgment is received from the base station, a plurality of first non-essential functions such as screen display and sound are reduced to reduce power consumption (block 320). Further, a plurality of second non-essential functions such as GPS location functions are reduced and/or turned off and an emergency sleep mode may be entered (block 324). Examples of emergency sleep mode functions have been previously described in detail. In particular, as one example, an update message may be periodically sent to the base station to indicate new locations of the mobile device if the mobile device location has changed (block 330).

As previously described, it should be appreciated that a wide variety of different protocols and process steps may be implemented in various orders to reduce non-essential functions and/or essential functions to preserve power for the mobile device. For example, as previously described essential functions of the mobile device may also be reduced or subtly changed to reduce power consumption from the power source such as: the frequency at which the mobile device scans for networks; decisions as to whether or not to attempt to establish a connection with a base station, etc.

As an example, in one embodiment, once a user enters an emergency mode request, non-essential and/or essential functions of the mobile device may be reduced right away to reduce power consumption from the power source before the short emergency message is sent and before acknowledgement is received back. Alternatively, non-essential and/or essential functions may be reduced after the short emergency message is transmitted. Further, non-essential and/or essential functions may be reduced both before and after the short emergency message is transmitted. It should be appreciated that the reduction of non-essential and/or essential functions to preserve power may be implemented in such a fashion as to ensure the greatest probability of successfully transmitting the short emergency message.

Figure 4:
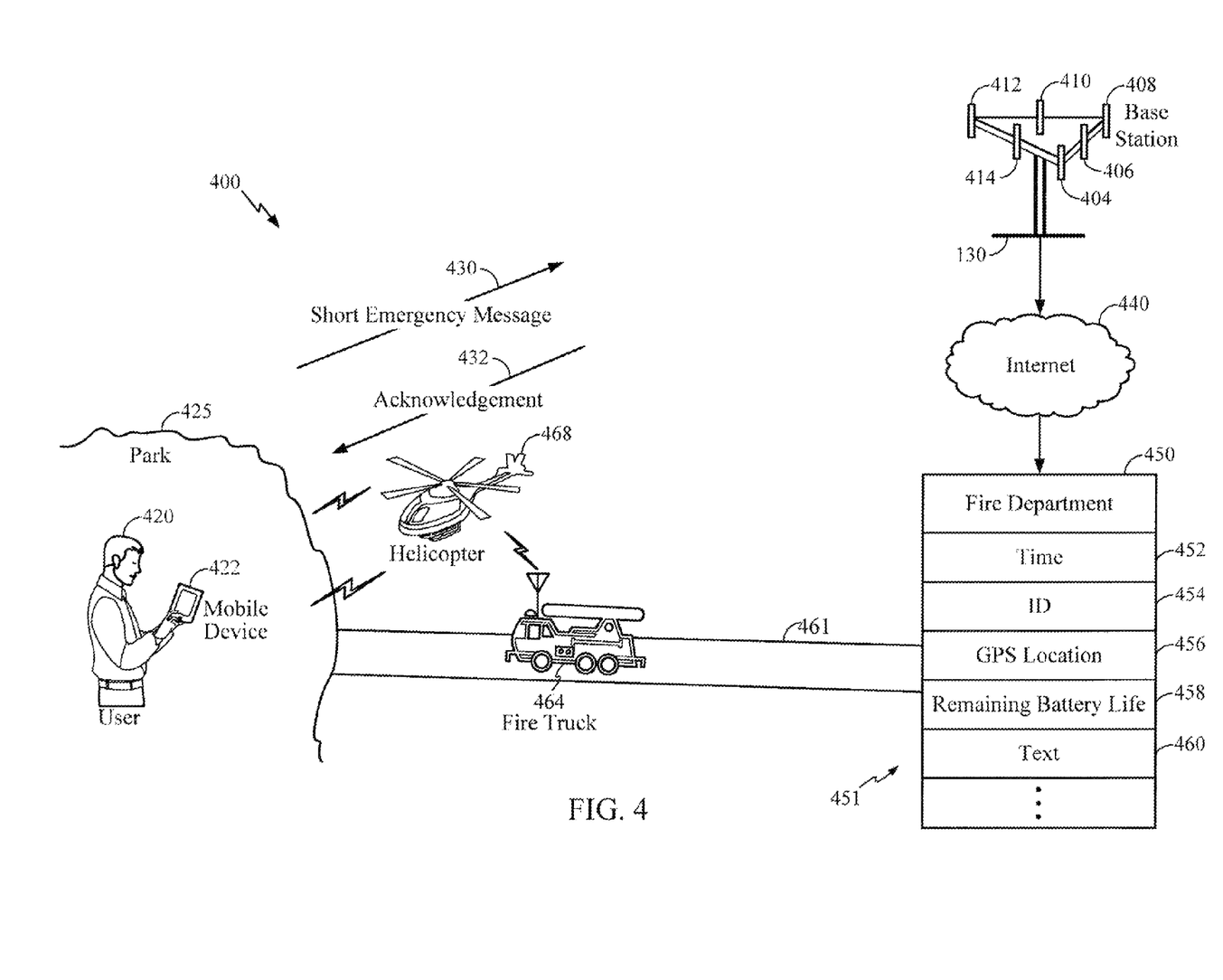
FIG. 4 is a diagram illustrating an example of a system of a mobile device utilizing a short emergency message to obtain emergency assistance for a user.

Turning to FIG. 4, FIG. 4 is a diagram illustrating an example of a system 400 of a mobile device 422 utilizing a short emergency message 430 to obtain emergency assistance for a user 420. As shown in FIG. 4, a user 420 utilizing their mobile device 422 may request emergency assistance from a remote location that may be hard for an emergency service provider to locate. In this particular example, the user 420 is located in a park 425. According to this example, the user 420 may make an emergency request. This may be from a special keyboard input on the mobile device 422, a particular vocal request, by the dialing of 911, or another type of emergency request.

Based upon the emergency request, the mobile device 422 monitors signals to locate the nearest base station 103. Once a base station 103 is located, a short emergency message 430 is transmitted to the base station 103 including at least the location of the mobile device 422. The mobile device 422 then monitors received signals to receive an acknowledgment 432 from the base station 103. Once an acknowledgment 432 is received, non-essential and/or essential functions of the mobile device may be reduced to reduce power consumption. As previously described, examples of these non-essential and/or essential functions include limiting or disabling the display of on-screen data, sound, GPS location functions, as well as other functions in order to preserve the power source for the mobile device 422.

Briefly, base station 103 may include multiple antenna groups, one including 404 and 406, another including 408 and 410, and an additional including 412 and 414. In FIG. 4, only two antennas are shown for each antenna group, however, more or fewer antennas may be utilized for each antenna group. For example, mobile device 422 may be in communication with antennas 412 and 414, wherein antennas 412 and 414 may transmit information to mobile device 422 over forward link 432 and receive information from mobile device 422 over reverse link 430. Base station 103 may be a fixed station used for communication with mobile devices and may also be referred to as a Node B, an evolved node eNB, serving eNB, target eNB, femto station, pico station, or some other terminology. Further, base station 103 may be connected through the Internet 440 and/or other network system(s) to an emergency service provider such as a police department, a fire department, a hospital, an ambulance service, etc. In particular, as will be described, in this example, base station 103 may be connected through the Internet 440 to a fire department 450.

Continuing with this example, the user 420 through mobile device 422 may transmit a short emergency message 430 to the base station 103 that includes such data as the time in the emergency mode 452, the mobile device ID 454, the mobile device's GPS location 456, remaining battery life 458 and particular inputted text 460. This short emergency message data 430 may be received by the base station 103 and may be communicated through the Internet 440 to the fire department 450 such that via an appropriate computer system, the fire department will have access to all of this data. In particular, the GPS location data 456 may provide the fire department 450 with the location of the mobile device 422 and user 420 and special inputted text data 460 from the user that may let the fire department know of any particular injuries to the user 420, particular emergency situations of the user, and particular locations. For example, the user 420 may input text that they have broken their arm, they have been assaulted by robbers, or that they are located at a particular portion of a trail of a park away from major streets to aid emergency service personnel in locating the user.

It should be appreciated that although the fire department is set forth in this example as an emergency service provider, any suitable emergency service provider, e.g., police department, ambulance service, military service, government service, etc., may be utilized as the emergency service provider.

Based upon this data received from the mobile device 422 and base station 130, a search team from the emergency service provider (e.g. firemen from the fire department 450) may be sent to locate the user 420 and mobile device 422. In essence, the base station 103 transmits the search request to the search team (e.g. fire department 450) through the Internet 440, or other means such as wired/wireless telephone, computer networks, etc.) to locate the mobile device 422 and user 420 wherein the—search request may include the location of the mobile device along with other information such as time in emergency mode, mobile device ID, GPS location, remaining battery life, and special inputted text data from the user. As an example, in FIG. 4, a search team including a fire truck 464 along a highway 461 is shown as traveling to park 425 to locate an injured and lost user 420 having mobile device 422. Thus, based upon the data received from the mobile device 422, a search team, e.g., firemen in fire truck 464, may be sent to locate the user 420.

In one example, a special stand-alone cell network may be utilized to locate the mobile device 422. It should be appreciated that the fire department search team: may or may not have a GPS location for the mobile device 422; may only have an estimated location from the base station 103; or the user may now have a different location. In this example, a portable stand-alone cell network may be used by the fire department search team 464 to aid in locating the mobile device 422 and the user 420. As one example, a helicopter 468 in combination with the firemen searching the park 425 may utilize a stand-alone cell network to locate the mobile device 422 and user 420.

In essence, in this example, network triangulation using data between the mobile devices of the firemen in the park 425 and the helicopter 468, all of which may be in periodic communication with the mobile device 422, may be utilized to locate the user 420 and mobile device 422. Thus, the firemen by utilizing their own mobile devices in conjunction with the helicopter 468 may communicate with each other and networkly triangulate positions to locate the user 420 and mobile device 422. The mobile devices utilized by the firemen and the helicopter 468 may be utilized to create a stand-alone cell network that periodically transmits updated location request to the mobile device 422 to try to find the most current location and shares all the newest locations among all of the mobile devices of the firemen and the helicopter 468 to help locate the mobile device 422 and user 420 at a remote location in the park 425. Thus, the firemen, and the helicopter 468 create a meshed searching network.

Utilizing this system 400 as illustrated FIG. 4, and previously described, a portable stand-alone cell network (i.e. not utilizing back haul, multiple femtocells or picocells) may be used as part of the search process. This network of mobile devices carried by search teams, helicopters, planes, land vehicles, etc., establishes a triangulation network of data over time to help locate the lost or injured user 420. Thus, a mesh searching network is created.

Because of the previously described power saving methods, the battery of the mobile device 422 may operate for a longer period of time such that the mobile device 422 is capable of sending more messages and locations for longer periods of time to the search team trying to locate them. Further, when GPS locations are used, the search team can more efficiently find the mobile device 422 and user 420. Moreover, utilizing the above-described procedures, large areas may be searched thoroughly and quickly (e.g. such as park 425) without active interaction from the lost user 420 who may be unconscious, sleeping, or severely injured.

Thus, this type of system 400 provides many advantages. As one example, the battery life of the mobile device 422 may be extended by entering the emergency mode in which all functions except for network monitoring functions are disabled. Additionally, the sending of the short emergency message 430 is much faster than traditional phone calls and provides a greater probability that a message is sent through to an emergency service provider 450 while there is still battery power and cell phone coverage available. Furthermore, because of the battery savings and the faster messages, the mobile device 422 may be capable of sending more messages and continuing operation for a longer period of time.

Moreover, by providing GPS location 456 and/or the base station 103 calculated location of the mobile device, without emergency respondent interaction (e.g., 911 staff), there is less chance of entering location errors for the emergency service team. In particular, this avoids possible confusion and conversations with emergency respondents (e.g., 911 staff) in which a user tries to indicate that they are not on a street, but are at a remote location, such as a park 425. Additionally, the use of stand-alone networks utilized by the emergency search team enables a quick response time to try to locate a missing user 420. As previously described, by utilizing emergency searchers, land vehicles, and/or aircraft, large areas may be searched thoroughly and quickly without active interaction from the lost user 420 which may be especially important if the user 420 is unconscious, terribly injured, or sleeping, and cannot communicate with the searchers. Further, this methodology enables searching throughout darkness and/or bad weather. Accordingly, the previously described system 400 provides a relatively quick and accurate methodology for locating a user 420 who has requested emergency assistance.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device (also referred to as a base station) may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
   a display device;
   a user interface to receive an emergency mode request from a user;
   a processor configured to execute instructions to implement an emergency mode process based upon the receipt of the emergency mode request from the user, the emergency mode process to:
   monitor received signals to locate a base station, wherein once a base station is located, a short emergency message is transmitted to the base station including the location of the mobile device and inputted text data from the user;
   monitor received signals to receive an acknowledgement signal acknowledging receipt of the short emergency message from the base station;
   reduce a plurality of first non-essential functions of the mobile device to reduce power consumption once the acknowledgement signal acknowledging receipt of the short emergency message from the base station is received;
   enter an emergency sleep mode to further reduce power consumption once the acknowledgement signal acknowledging receipt of the short emergency message from the base station is received; and
   after the emergency sleep mode is entered, transmit a new location to the base station if the location of the mobile device has changed; and
   a memory configured to store the instructions.

2. The mobile device of claim 1, wherein the short emergency message is a short message service (SMS) text message to local emergency services.

3. The mobile device of claim 1, wherein the short emergency message is transmitted if 911 is inputted to the user interface.

4. The mobile device of claim 1, wherein the location of the mobile device is a GPS location generated by the mobile device.

5. The mobile device of claim 1, wherein the short emergency message further comprises data related to at least one of time in the emergency mode or remaining battery life.

6. The mobile device of claim 1, wherein, after the emergency sleep mode is entered, the emergency mode process implemented by the processor further comprises functions including periodically transmitting an update message to the base station.

7. The mobile device of claim 1, wherein the base station transmits a search request to a search team to locate the mobile device, wherein the search request includes the location of the mobile device.

8. The mobile device of claim 7, wherein the search team utilizes a standalone cell network to locate the mobile device.

9. The mobile device of claim 8, wherein the search team utilizing the standalone cell network periodically transmits an updated location request to the mobile device.

10. A method to locate a mobile device in an emergency situation comprising:
    receiving an emergency mode request from a user;
    monitoring received signals to locate a base station, wherein once a base station is located, a short emergency message is transmitted to the base station including the location of the mobile device and inputted text data from the user;
    monitoring received signals to receive an acknowledgement signal acknowledging receipt of the short emergency message from the base station;
    reducing a plurality of first non-essential functions of the mobile device to reduce power consumption once the acknowledgement signal acknowledging receipt of the short emergency message from the base station is received;
    entering an emergency sleep mode to further reduce power consumption once the acknowledgement signal acknowledging receipt of the short emergency message from the base station is received; and
    after the emergency sleep mode is entered, transmitting a new location to the base station if the location of the mobile device has changed.

11. The method of claim 10, wherein the short emergency message is a short message service (SMS) text message to local emergency services.

12. The method of claim 10, wherein the short emergency message is transmitted if 911 is inputted to a user interface.

13. The method of claim 10, wherein the location of the mobile device is a GPS location generated by the mobile device.

14. The method of claim 10, wherein the short emergency message further comprises data related to at least one of time in the emergency mode or remaining battery life.

15. The method of claim 10, further comprising implementing functions including after the emergency sleep mode is entered, at least one of periodically transmitting an update message to the base station.

16. The method of claim 10, wherein the base station transmits a search request to a search team to locate the mobile device, wherein the search request includes the location of the mobile device.

17. The method of claim 16, wherein the search team utilizes a standalone cell network to locate the mobile device.

18. The method of claim 17, wherein the search team utilizing the standalone cell network periodically transmits an updated location request to the mobile device.

19. A mobile device comprising:
   means for receiving an emergency mode request from a user;
   means for implementing an emergency mode process based upon the receipt of the emergency mode request from the user;
   means for monitoring received signals to locate a base station, wherein once a base station is located, implementing means for transmitting a short emergency message to the base station including the location of the mobile device and inputted text data from the user;
   means for monitoring received signals to receive an acknowledgement signal acknowledging receipt of the short emergency message from the base station;
   means for reducing a plurality of first non-essential functions of the mobile device to reduce power consumption once the acknowledgement signal acknowledging receipt of the short emergency message from the base station is received;
   means for entering an emergency sleep mode to further reduce power consumption once the acknowledgement signal acknowledging receipt of the short emergency message from the base station is received; and
   means for after the emergency sleep mode is entered, transmitting a new location to the base station if the location of the mobile device has changed.

20. The mobile device of claim 19, wherein the short emergency message is a short message service (SMS) text message to local emergency services.

21. The mobile device of claim 19, wherein the short emergency message is transmitted if 911 is inputted to a user interface.

22. The mobile device of claim 19, wherein the location of the mobile device is a GPS location generated by the mobile device.

23. The mobile device of claim 19, wherein the short emergency message further comprises data related to at least one of time in the emergency mode or remaining battery life.

24. The mobile device of claim 19, wherein, after the emergency sleep mode is entered, the emergency mode process further comprises means for implementing functions including periodically transmitting an update message to the base station.

25. The mobile device of claim 19, wherein the base station transmits a search request to a search team to locate the mobile device, wherein the search request includes the location of the mobile device.

26. The mobile device of claim 25, wherein the search team utilizes a standalone cell network to locate the mobile device.

27. The mobile device of claim 26, wherein the search team utilizing the standalone cell network periodically transmits an updated location request to the mobile device.

28. A computer program product comprising:
   a non-transitory computer-readable storage medium comprising code for:
      receiving an emergency mode request from a user;
      implementing an emergency mode process based upon the receipt of the emergency mode request from the user, the emergency mode process including code for:
         monitoring received signals to locate a base station, wherein once a base station is located, implementing code for transmitting a short emergency message to the base station including the location of the mobile device;
         monitoring received signals to receive an acknowledgement signal acknowledging receipt of the short emergency message from the base station;
         reducing a plurality of first non-essential functions of the mobile device to reduce power consumption once the acknowledgement signal acknowledging receipt of the short emergency message from the base station is received;
         entering an emergency sleep mode to further reduce power consumption once the acknowledgement signal acknowledging receipt of the short emergency message from the base station is received; and
         after the emergency sleep mode is entered, transmitting a new location to the base station if the location of the mobile device has changed.

29. The computer program product of claim 28, wherein the short emergency message is a short message service (SMS) text message to local emergency services.

30. The computer program product of claim 28, wherein the short emergency message is transmitted if 911 is inputted to a user interface.

31. The computer program product of claim 28, wherein the location of the mobile device is a GPS location generated by the mobile device.

32. The computer program product of claim 28, wherein the short emergency message further comprises data related to at least one of time in the emergency mode or remaining battery life.

33. The computer program product of claim 28, wherein, after the emergency sleep mode is entered, the emergency mode process further comprises code for implementing functions including at least one of periodically transmitting an update message to the base station.

34. The computer program product of claim 28, wherein the base station transmits a search request to a search team to locate the mobile device, wherein the search request includes the location of the mobile device.

35. The computer program product of claim 34, wherein the search team utilizes a standalone cell network to locate the mobile device.

36. The computer program product of claim 35, wherein the search team utilizing the standalone cell network periodically transmits an updated location request to the mobile device.

* * * * *